Patented Oct. 25, 1949

2,485,680

UNITED STATES PATENT OFFICE 2,485,680

DIHYDROSAFROL DERIVATIVES

Herman Wachs, Brooklyn, N. Y., assignor, by mesne assignments, to U. S. Industrial Chemicals, Inc., New York, N. Y., a corporation of Delaware No Drawing. Application April 1, 1946,
Serial No. 658,872

4 Claims. (Cl. 260—338)

This invention relates to new derivatives of dihydrosafrol and includes halomethyl and hydroxymethyl derivatives which are valuable as intermediates for the making of insecticides and synergists, as well as insecticides and synergists made therefrom.

I have found that chloromethyl dihydrosafrol can be readily prepared by the reaction of formaldehyde and hydrochloric acid on dihydrosafrol.

Dihydrosafrol has the structural formula

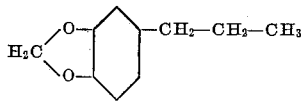

as described in Beilstein 19, 27 (1934).

I have also found that this chloride may be reacted with amines and with alkali salts of phenols, thiophenols, alcohols, acids or the like to produce insecticides or insecticide raw materials or synergists.

I have also found that this chloride may be saponified to the corresponding alcohol and that this alcohol may be reacted with acids, acid chlorides or acid anhydrides to give esters.

The new halomethyl and hydroxymethyl derivatives of dihydrosafrol have the following general formula

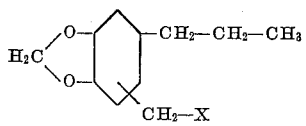

in which X is halogen or hydroxyl.

When such derivatives are further reacted, for example, when the chloride is reacted with alkali salts of phenols, thiophenols, mercaptans, alcohols, acids, etc., or with amines, or when the alcohol is reacted with acids, acid chlorides or acid anhydrides to form esters, to produce insecticides or insecticide raw materials or synergists these reaction products have the following general formula

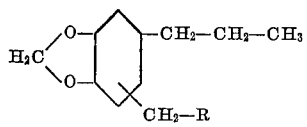

in which R is the radical or residue or nucleus of the phenol, thiophenol, alcohol, acid, amine, etc.

Dihydrosafrol is readily produced by the hydrogenation of safrol or isosafrol. Dihydrosafrol can be readily converted into the chlormethyl derivative or the methylenedioxy propyl benzylchloride by reaction with formaldehyde and hydrochloric acid. The preparation of this product is illustrated by the following example, the parts being by weight:

162 parts of dihydrosafrol, 150 parts of 40% formaldehyde solution, and 500 parts of concentrated hydrochloric acid are mixed and agitated for a period of about 36 hours at a temperature below 20° C. The oily bottom layer is separated and the water layer is extracted with benzol. The benzol solution and the separated oil are combined and neutralized with sodium bicarbonate solution. The solution is dried, the benzol is distilled off, and the remaining oil is distilled in vacuo. The methylchloride derivative distilled at about 128° C. at 4 mm. pressure. It is a colorless oil heavier than water. The chlorine content was determined by saponification and gave a saponification value of 265 (calculated 262).

It will be understood that the detailed procedure of this example can be varied. Thus, the reaction temperature and the proportions of the ingredients may be varied, polymeric formaldehyde such as paraformaldehyde can be used or formaldehyde gas may be used instead of formaldehyde solution, and HCl gas instead of HCl solution.

Dihydrosafrol may be similarly reacted with formaldehyde and hydrobromic acid to produce methylenedioxy propyl benzylbromide, but the reaction is not as clean-cut as in the case of the above example using hydrochloric acid and a somewhat higher proportion of higher molecular compounds was obtained. This production of the brommethyl derivative of dihydrosafrol is illustrated by the following example, the parts being by weight:

82 parts of dihydrosafrol, 75 parts of formaldehyde solution and 505 parts of 40% hydrobromic acid were mixed and agitated for 36 hours and the reaction mixture worked up in the same manner as outlined above for the chloride. At 137–141° C. and 2.5 millimeters pressure, a colorless oil was collected which turned slightly brownish on standing. The saponification value was 219 while that calculated for methylenedioxy propyl benzylbromide is 217.9.

The chlormethyl derivative of dihydrosafrol is particularly valuable as an intermediate for the production of insecticides or insecticide raw materials or synergists. It is a more desirable intermediate and reaction product than the chlormethyl derivative of safrol or isosafrol, being considerably more stable and yielding reaction products of higher purity and stability. The absence from dihydrosafrol of the double bond which is present in the side chain of safrol and isosafrol avoids the formation of hydrochloric acid addition products at the double bond and the splitting off of the hydrochloric acid such as likely to occur in the production of chlormethyl derivatives of safrol and isosafrol by reaction with formaldehyde and hydrochloric acid where the hydrochloric acid which adds at the double bond may be split off on distillation of the reaction product with a tendency to cause resinification and also to catalyze the splitting off of hydrochloric acid out of the chlormethyl group.

The chlormethyl derivatives of dihydrosafrol may be reacted with amines or with the alkali salts of phenols, thiophenols, alcohols, mercaptans, acids, etc., to produce insecticides or insecticide raw materials or synergists. It may thus be reacted with primary or secondary amines as illustrated by the following equation:

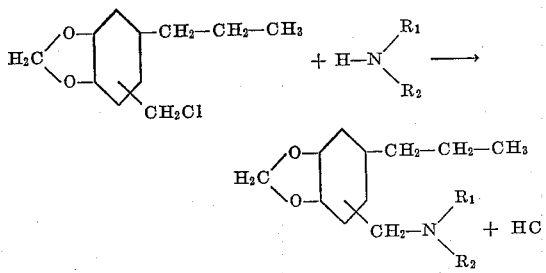

In this equation $R_1$ is hydrogen in the case of a primary amine and $R_2$ is alkyl, aryl, etc., while in the case of the secondary amines both $R_1$ and $R_2$ represent radicals or groups such as alkyl, aryl, etc.

Such amine reaction products have been prepared and found to show synorgism when used with pyrethrins in making insecticidal compositions. The preparation of such products is illustrated by the following examples:

The dibutyl amine reaction product was prepared as follows: 68 parts of di-butylamine were dissolved in 23 parts of benzene, 53 parts of the chlormethyl compound were added under cooling, the mixture was allowed to stand for one hour and was then refluxed for 4 hours. Water was then added, the oil was separated, the benzene distilled off, then steam passed through the remainder to remove excess dibutylamine. The main product distills in vacuo at 171–174° and 3.7 mm. It is an odorless, viscous oil, turning slightly yellow on standing.

The cyclohexylamine reaction product was prepared as follows: 52.5 parts of cyclohexylamine were dissolved in 23 parts of benzene, 53 parts of the chlormethyl compound were added under cooling, the mixture was allowed to stand for 2 hours and was refluxed on the steam bath for 2 hours. Water was then added, the oil was separated, benzene distilled off, and steam was passed through the remainder to remove excess cyclohexylamine. The main product was distilled in vacuo at 174–180° and 2 mm. It is an odorless, somewhat viscous oil, turning yellow on standing.

The chlormethyl derivative of dihydrosafrol may also be reacted with various sodium compounds as indicated above. The reaction with the sodium salts of alcohols and phenols is illustrated by the following examples:

The octyl ether was prepared as follows: 6.00 parts of metallic sodium were dissolved in 120 parts of octylalcohol (2-ethylhexanol), the solution was cooled and 53 parts of the chloromethyl compound were added. After standing overnight the solution was refluxed for 4 hours. It was washed twice with water, the benzene distilled off, the excess octylalcohol was removed in vacuo and the reaction product rectified in vacuo. It boiled at 157–159° at 1.2 mm.

The tetrahydrofurfurylether was prepared as follows: 11.5 parts of sodium hydroxide pellets, 102 parts of tetrahydrofurfurylalcohol and 45 parts of benzene were refluxed using a water trap until no more water was collected. After cooling, 53 parts of the chloromethyl compound were added, and the mixture was allowed to stand overnight. It was then refluxed for 4 hours. It was washed with water, the benzene layer was filtered, the benzene was distilled off and the remainder of oil distilled in vacuo, the ether distilling at 170–172° and 2 mm.

The benzylether was prepared as follows: 6 parts of sodium were dissolved in 100 parts of benzylalcohol under warming, the solution was cooled and 53 parts of the chloromethyl compound were added. The mixture was allowed to stand overnight and was then refluxed for 4 hours. After washing with water and distilling off the solvent and the excess benzylalcohol, the main product distilled at 184–186° at 1.5 mm.

The phenylether was prepared as follows: 94 parts of phenol, 55 parts 20% sodiumhydroxide solution in water and 180 parts of benzene were refluxed using a water trap until no more water would collect. 53 parts of the chloromethyl compound were added under cooling over a period of ½ hour. The mixture was allowed to stand overnight, and was then refluxed for 4 hours. After washing with water and distilling off the solvent, the main product distilled at about 200° and 1.5 mm.

The chloromethyl derivative of dihydrosafrol may also be reacted with the sodium compounds of acetoacetates, such as ethyl, butyl, hexyl or tetrahydro furfuryl acetoacetates with splitting off of sodium chloride according to the following equation:

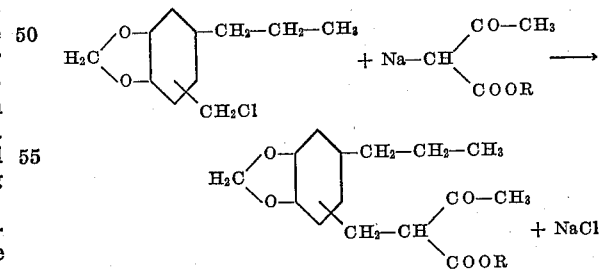

In this equation R represents the ethyl, hexyl, etc., group of the acetoacetate used, e. g., R= ethyl in the case of ethylacetoacetate.

Products so produced show synergism with pyrethrin when used in making insecticide compositions.

The preparation of such products is illustrated by the following example, using ethylacetoacetate: 12 parts of sodium were dissolved in a solution of 71.5 parts of ethylacetoacetate in 240 parts of absolute alcohol. To this solution was added under cooling 106 parts of the choromethyl compound, salt beginning to separate almost immediately. The mixture was allowed to stand overnight and then heated on a steam bath for 2 hours. The mixture was washed with water, extracted with benzol, separated and dried. The benzol and the small excess of ethylacetoacetate were distilled off in vacuo. The remaining light colored oil may be used without further purification.

In a similar manner to that above described for the preparation of the ethylacetoacetate reaction product were prepared the (propyl, methylenedioxy)-benzyl compounds of tetrahydrofurfurylacetoacetate, butylacetoacetate, octylacetoacetate and hexylacetoacetate.

A particularly valuable product is obtained when the chloromethyl derivative of dihydrosafrol is reacted with the sodium salt of diethylene glycol monobutyl ether (butyl Carbitol) to form an ether derivative as illustrated by the following equation:

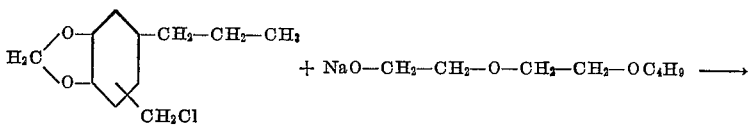

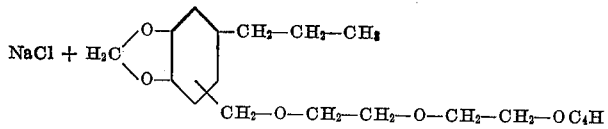

The preparation of the butyl Carbitol derivative is illustrated by the following example: 22 parts of sodium hydroxide pellets were added to 162 parts of butyl Carbitol in 90 parts of benzene, and the mixture was refluxed using a water trap until no more water was collected (approximately 18 hours).

The solution was cooled and under continued cooling 106 parts of chloromethyl compound in 45 parts of benzene were added. After standing overnight the mixture was refluxed for 4 hours. The salt which separates is removed by washing with water, the separated benzol solution is dried, the benzol is distilled off. The remaining oil may be distilled in vacuo. Some of the excess butyl Carbitol distills over, then the final product distills at about 195° at 2 mm. It is a colorless oil, soluble in benzene, isopropanol and most inorganic solvents.

The resulting product is a valuable insecticide raw material or synergist. When used with pyrethrin in the proportions of 30 mg. of pyrethrin and 300 mg. of the above ether dissolved in 100 cc. of odorless kerosene, an insecticide spray is produced which will give practically complete knockdown and kill of flies. The above ether is completely miscible with kerosene and Freon (dichlordifluoromethane). It is chemically stable and is odorless and non-irritating, which is of primary importance in the compounding of household insecticides. Its combination of properties makes this product an outstanding insecticide ingredient.

The product produced from the chloromethyl derivative of dihydrosafrol and butyl Carbitol is higher in insecticidal activity than the product produced from the chloromethyl derivative of safrol and butyl Carbitol, and it has the further advantage of being completely soluble in Freon and in petroleum fractions. This increased insecticidal activity of the chloromethyl derivative of the dihydrosafrol as compared with the corresponding derivative of safrol is unexpected and surprising because in a number of cases hydrogenation of an insecticidally active material will eliminate the activity or very materially reduce it.

Other halomethyl derivatives of dihydrosafrol such as the brommethyl derivative may be similarly produced and used as as intermediate for reaction with alkali salts of phenols, thiophenols, alcohols, mercaptans, acids, etc., or for reaction with amines to produce insecticides or insecticide raw materials or synergists. And the hydroxymethyl derivative which may be produced by saponification of the chloromethyl derivatives can also be used as an intermediate for reaction with acids, acid chlorides or acid anhydrides to form ester derivatives.

It will thus be seen that the halomethyl and hydroxymethyl derivatives of dihydrosafrol are valuable products, particularly for use as intermediates in the production of insecticides or insecticide ingredients or synergists and that a wide range of new products can be produced therefrom. Reference is made to my copending application, Serial No. 729,883, filed February 20, 1947.

I claim:

1. The compounds of the generic formula

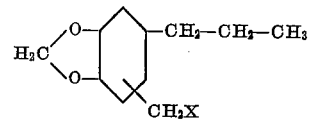

in which X is a substituent selected from the group consisting of the chlorine atom, the bromine atom and the hydroxyl radical.

2. The compounds of claim 1 in which X is the chlorine atom.

3. The compounds of claim 1 in which X is the bromine atom.

4. The compounds of claim 1 in which X is the hydroxyl radical.

HERMAN WACHS.

REFERENCES CITED

The following references are of record in the file of this patent:

UNITED STATES PATENTS

| Number | Name | Date |
|---|---|---|
| 2,421,569 | La Forge et al. | June 3, 1947 |

OTHER REFERENCES

Adams et al.: Organic Reactions, vol. I, chp. 3, J. Wiley & Sons (1942).

Thorpe: Dict. of Applied Chem., vol. VI, page 12.

Prill et al.: Contrib. of Boyce Thompson Instit., Jan.-Mar. (1946).

Certificate of Correction

Patent No. 2,485,680　　　　　　　　　　　　　　　　　　　　　　　October 25, 1949

HERMAN WACHS

It is hereby certified that errors appear in the printed specification of the above numbered patent requiring correction as follows:

Column 3, line 17, for the word "derivatives" read *derivative*; line 33, for that portion of the equation reading "+HC" read +*HCl*; column 5, lines 30, 33 and 45, insert quotation marks before and after the word "Carbitol"; column 6, line 8, for "as intermediate" read *an intermediate*;

and that the said Letters Patent should be read with these corrections therein that the same may conform to the record of the case in the Patent Office.

Signed and sealed this 21st day of February, A. D. 1950.

[SEAL]

THOMAS F. MURPHY,
　　　　　　　　　　　　　　　　　　　　　　　　　*Assistant Commissioner of Patents.*